United States Patent Office 3,254,563
Patented June 7, 1966

3,254,563
RETRO-REFLECTIVE PARTICLES AND REFLECTIVE MARKERS AND COMPOSITIONS CONTAINING SUCH PARTICLES
Eduard R. de Vries, Flemington, N.J., and Alistair J. Ross, Wallingford, Conn., assignors to Prismo Safety Corporation, Huntingdon, Pa., a corporation of Pennsylvania
Filed Nov. 12, 1963, Ser. No. 322,857
6 Claims. (Cl. 88—82)

The present invention relates to reflective marking materials and more particularly to reflective spheroids and to reflective markers and highway marking compositions containing the reflective spheroids.

This application is a continuation-in-part of co-pending applications Serial No. 61,998, filed October 11, 1960, entitled "Reflective Spheroids," now abandoned, and Serial No. 146,187, filed October 19, 1961, entitled "Reflective Marker and Composition," now abandoned.

Heretofore in highway markers it has become standard practice to incorporate small glass spheres in traffic paint either as a pre-mix or by dropping the glass spheres onto the paint while it is still tacky so that the spheres are partially embedded in the paint when it has dried. When an immediately reflective marker is desired, the latter procedure is utilized. This is a two-step process, and the industry has long been seeking a single operation which will yield an immediately reflective marker.

It has also been proposed heretofore to pre-mix the small glass spheres with the binder and pigment and to spray this mixture onto the base to be reflectorized. Such a highway surface marker initially has the glass beads buried in the paint film but the wearing action of vehicular traffic causes the upper extremities of the beads to become exposed so that reflex light-reflective properties are obtained to yield night time visibility to motorists.

It is an object of the present invention to provide a novel type of reflective spheroid that can be used in highway markers.

A further object of the present invention is to provide a novel reflective highway marker which utilizes these reflective spheroids.

A still further object of the present invention is to provide a composition which may be applied to a base which quickly dries to yield an immediately reflective marker.

Other objects and the nature and advantages of the instant invention will be apparent from the following description taken in conjunction with the accompanying drawings, wherein.

Figure 1:
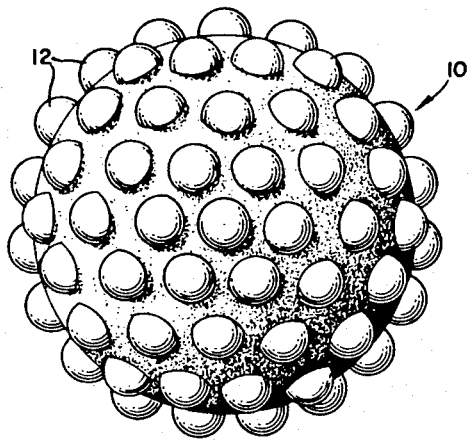
FIG. 1 is an enlarged plan view of a reflective spheroid made in accordance with the present invention.

The reflective spheroids made in accordance with the present invention are each a substantially spherically shaped entirely once cured monolithic core of thermosetting binder material having its entire outer surface covered with small glass spheres partially embedded and securely held therein.

These reflective spheroids may be manufactured in a novel manner by spraying or dropping the binder material in liquid discrete droplets onto a mass of small glass spheres. The individual glass spheres coming into contact with the liquid droplets will become approximately half-way embedded in the droplet. The droplet solidifies into a solid spheroid covered completely with the small glass spheres on its surface. The glass spheres may be heated or non-heated, and the mass of spheres may be stationary or agitated depending on the method used.

This method lends itself to rapid continuous industrial production by means of a conveyor belt in continuous vibration and similar systems.

The present invention results in a reflective material that has many advantages. The size of the droplets can be regulated whereby a very uniform size of the spheroids may be obtained. Further, the method used herein results in spheroids wherein all of the glass beads are on the surface and none are inside the spheroids.

Thus, it is seen that in this method of manufacture, the liquid core is cured after the glass beads have been partially embedded therein so that the resulting spheroid has a once-cured monolithic core of thermosetting material. Such spheroids have been found to retain the glass spheres securely so that they are not substantially dislodged by shaking, dropping or impact.

When incorporated in a traffic marker, lane line or sign, these reflective spheroids afford excellent reflectivity and angularity and a great improvement over the previous glass sphere drop-on marker. Particularly good results are obtained in traffic lines due to the high angularity at grazing angles of the light.

The size of glass spheres used and its index of refraction can be varied over wide limits. The glass spheres can range from ½ mil up to 30 mils depending to some extent on the size of the reflective spheroid being made. Preferably the glass spheres are smaller than 3 mils. The glass spheres can be clear transparent glass or for certain purposes they may be reflectively coated spheres such as silvered glass spheres or even metallic spheres. The index of refraction of the glass may vary for different purposes from approximately 1.5 up to a high index glass of approximately 2.4.

The core material may be pigmented with a reflective pigment, particularly when lower index of refraction glass spheres are used. On the other hand, when high index glass is used which has an index of refraction high enough such that the point of focus of the light returned is within the spheres, approximately 2.0 or over, the core material need not be reflective since the light will be reflected back from within the spheres and the reflecting backing is no longer required.

When reflectively coated glass spheres are used, after the spheroids have been solidified with the reflectively coated glass spheres on the surface, the resulting spheroids can be used as is or if desired, the outer exposed silvered coating on the glass spheres can be removed by washing the spheroids in nitric acid or the like. Thus, the resulting reflecting spheroid has glass beads which are reflectively coated only on their embedded portions. Such spheroids require no reflectivity in the core material used.

As a core material, particularly good results have been obtained using polyester resin compositions, epoxy resins, polyurethane resins, thermosetting polystyrene resins, and other thermosetting resins which solidify rapidly while in contact with the glass spheres.

The glass spheres may be mintained at a temperature of 200–400° F. The heated individual glass spheres coming into contact with the core material droplets will lower the viscosity of the binder during the very short interval of time required for the glass spheres to become approximately halfway embedded in the droplet. Immediately however, because of the heat transferred, the droplet now covered with glass spheres starts to cure to a solid spheroid. The curing can be completed when necessary by conveying the coated spheroids into an oven. The core material thus becomes a once-cured monolithic core of thermosetting material.

When the core material is such that it requires heat for solidifying, the heat may be supplied through the heated beads, by an oven, or by the heated beads followed by heating in an oven. On the other hand, when suitable accelerators are added to the binder and the solidification occurs at room temperatures, then no additional heat may be needed.

The droplets of liquid core material can be formed in various ways as by spraying from a spray gun. Another method of obtaining uniform droplets size has been devised which utilizes a small spinning flat disc. The core material brought into contact with the surface of the spinning disc will break up into uniformly sized droplets and will be flung by centrifugal force from the disc onto a conveyor belt covered with a dense layer of glass spheres. The spinning droplets pass along the surface of the layer of glass spheres picking up spheres on its surface in the nature of a rolling snow ball. The conveyor belt passes through an infrared oven to cure the core material, and the resulting spheroids have been found to be of substantially uniform size and substantially uniformly coated with the glass spheres. The depth of embedding of the spheres, as well as the shape, plasticity and rigidity of the monolithic core can be controlled by chemical modification; this insures better sphere retention.

Figure 2:
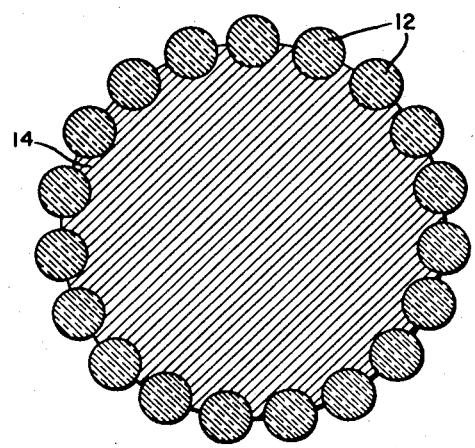
FIG. 2 is a cross-sectional view taken through the center of the spheroid of FIG. 1.
Figure 3:
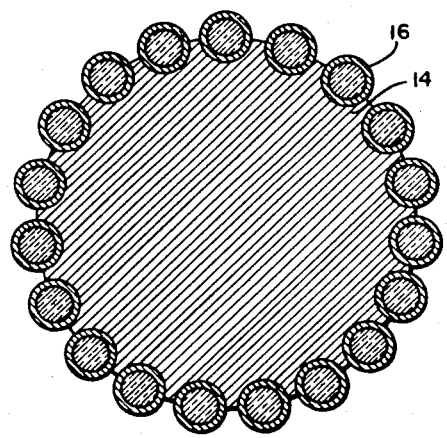
FIGS. 3 and 4 are cross-sectional views similar to FIG. 2 of a modified form of the invention.
Figure 4:
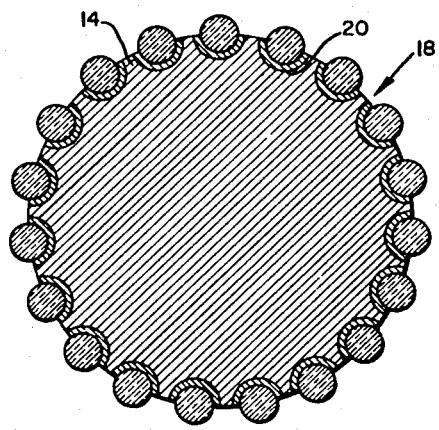

In the drawings, in FIG. 1, a reflective spheroid 10 is shown is uniformly coated with glass spheres 12. As shown in the cross-section of FIG. 2, the spheroids 10 have the glass spheres 12 partially embedded in the outer surface thereof and the core 14 of the spheroid has no glass spheres therein. FIG. 3 shows the use of reflectively coated glass spheres 16 instead of the transparent glass spheres 12 of FIGS. 1 and 2. FIG. 4 shows the reflective spheroid 18, wherein the outer reflective coating of the glass spheres has been removed so that each glass sphere has the reflective coating 20 only on its embedded portion.

Figure 5:
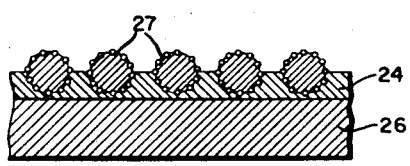
FIG. 5 is a sectional view through a roadway marker showing the spheroids partially embedded in a binder coating.

The reflective spheroids may be used as shown in FIG. 5, by applying a coating layer 24 onto the roadway or sign 26 and then dropping on the reflective spheroids 27 so that they become partially embedded in the coating layer 24.

When the coating layer used has a binder similar to that used in the spheroids, particularly good adhesion is obtained between the coating layer and the spheroid.

Figure 6:
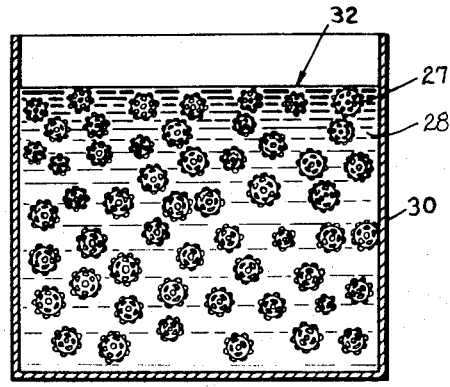
FIG. 6 shows the pre-mixed coating composition of this invention in the can.

The reflective spheroids 27 may also be pre-mixed with a binder material 28 in a can 30 as shown in FIG. 6. This composition 32 can be applied to any base material 34, such as a road, by spraying, brushing rolling, on any other method. After it has dried or cured, a marker as shown in FIG. 7 results.

Figure 7:
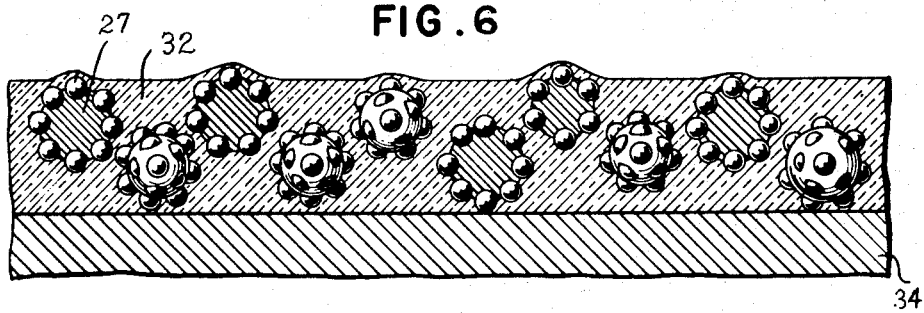
FIG. 7 is an enlarged sectional view through a roadway marker showing the marker made by application of the coating composition of FIG. 6.
Figure 8:
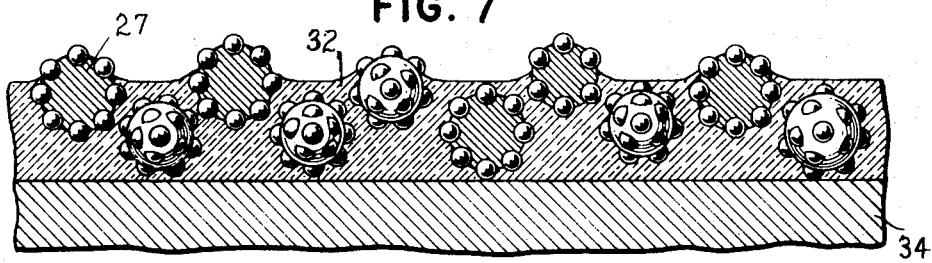
FIG. 8 is an enlarged view similar to FIG. 7 showing the marker after traffic thereon.

When the binder material 28 contains a pigment, the marker as shown in FIG. 7 is not immediately reflective, but becomes reflective when traffic wears away the binder material to expose the upper surfaces of the reflective spheroids 27 as shown in FIG. 8.

Figure 9:
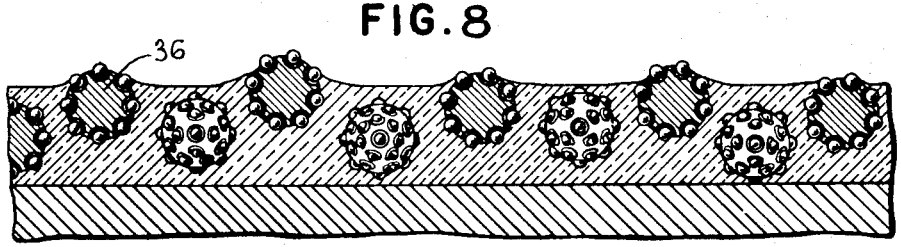
FIG. 9 is an enlarged sectional view through a modified form of marker.

As shown in FIG. 9, the reflective spheroids 36 are of the type shown in FIG. 4 with the underneath sides of the partially embedded glass spheres being reflectively coated.

When the binder material 28 contains no pigment but is a transparent binder material, then the binder layer 32 as shown in FIG. 7 permits the transmission of light through the binder to the small glass spheres 12 on the outer surfaces of the spheroids 27. In such cases, using the transparent binder, it is preferred to use glass spheres on the spheroids which have a refractive index of approximately 2.4 or a mixture of lower index spheres with the 2.4 index.

In the dried marker as shown in FIG. 7, the layer of binder over the spheroids, through which the light must pass in order to reach the glass spheres, has a refractive index in the order of 1.50 and has a tendency to destroy the retro-reflective effect unless relatively high index glass is used. Thus, the marker is immediately retro-reflective as soon as it has solidified on the base surface. Of course, as shown in FIG. 8, after traffic has abraded away the overlying layer of binder, the retro-reflective effect is obtained even with low index glass spheres.

The reflective spheroids can be added to the binder in the range of 1 to 10 lbs. of spheroids per gallon of the resulting composition.

As the core material in the spheroids, polyesters, epoxies, polyurethanes, thermosetting polystyrene, and other thermosetting materials may be used as long as they cure by heat or catalyst while in contact with the glass spheres so that the glass spheres become partially embedded therein.

The core material may include other materials such as pigments and fillers, catalysts, accelerators, solvents and the like as necessary.

Polyester resin compositions may be suitably used as the core material for the spheroids. In general, these compositions comprise an unsaturated polyester resin and a monomeric polymerizable material that does no give off volatile matter during curing.

Polyester resins are a class of resins, which is well known to those skilled in the art. In general, polyester resins are unsaturated alkyd resins formed by the reaction of one or more dicarboxylic acid components and one or more polyhydric alcohols. Illustrative of the dicarboxylic acid components are the saturated components phthalic anhydride and adipic and azelaic acids, and the unsaturated components fumaric acid and maleic acid. Illustrative of the dihydric alcohols most commonly used are glycols of ethylene, propylene, 1,3- and 2,3-butylene, diethylene and dipropylene. An unsaturated monohydric alcohol, such as allyl alcohol, may be used in the place of part of the polyhydric alcohol. One or more of the acid components or polyhydric alcohols should contain a reactive double or ethylene linkage. It is essential that one of the components of the polyester resin contain an unsaturated ethylenic linkage. The polyester reaction products are mixed with a non-volatile unsaturated monomeric cross-linking agent for the polyester resin. Illustrative of the monomeric agents are the unsaturated hydrocarbons, such as styrene, vinyl toluene, vinyl acetate, methyl methacrylate, alpha and para methyl styrene, divinyl benzene, ethyl acrylate, acrylonitrile, diallyl esters, cyclo pentadiene, triallyl cyanurate, and many others. The monomeric agent serves to make the polyester resin more fluid and also to cross-link the resin at the time of curing to produce a cross-linked or three-dimensional polyester resin, which is thermosetting in character. The monomeric agent is of a nature that it is consumed during the curing of the resin without forming volatile materials.

The properties of the polyester resin compositions can be varied through the use of various dibasic acids, different glycols, and different monomers, each in varying ratio to the others, permitting preparation of end products with almost any desired properties.

Suitable catalysts which are added to the formulation to cure the polyester resin composition may be selected from a large number of oxidizing catalysts such as benzoyl peroxide, di-t-butyl peroxide, 2,4-dichlorobenzoyl peroxide, methyl ethyl ketone peroxide, cyclohexane peroxide, cumene hydroperoxide, bis (parabromobenzoyl) peroxide, bis (phthalyl) peroxide, bis (parachlorobenzoyl) peroxide, bis (succinyl) peroxide, acetyl benzoyl peroxide, bis (chloroacetyl) peroxide, bis (acetyl) peroxide, tertiary-butyl hydroperoxide, bis (dichlorobenzoyl) peroxide, and 2,2-bis (tertiarybutyl peroxy) butane, with which those skilled in the art are familiar. For rapidly curing polyester compositions, the catalyst at least in part is benzoyl peroxide.

Accelerators for the polyester composition may be added to impart glossiness, to minimize stickiness of the material and primarily to decrease the time necessary for gelation or cure of the resin at room temperatures.

Illustrative of the accelerators are the cobalt, manganese, vanadium, calcium and iron soaps of organic acids, such as the naphthenates, dimethylaniline, and mixtures of dimethylaniline with ethylene diamine, diethylene triamine triethylene tetramine, tridimethyl amino methyl phenol, and the other primary, secondary and tertiary amines.

The epoxy resins employed in accordance with the present invention give particularly good results and are commonly referred to as poly glycidyl ethers of polyhydric alcohols and glycidyl ethers of bis-phenols, characterized by the following general formula:

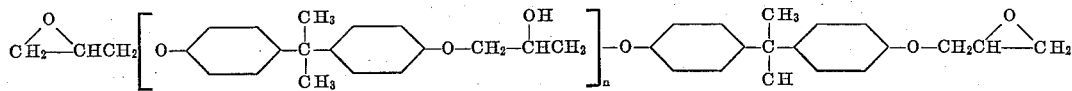

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the trade names of Epons. Epon 828, for example, has a melting point of 8–12° C. and an epoxide equivalent ranging between 190–210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclo-diepoxy carboxylate resin may be used which is sold by Union Carbide and Carbon Co. as Epoxide 201.

When an epoxy resin is used as the core material, a heat sensitive catalyst may be used which yields a composition that is stable at room temperatures and which cures when heated. Such a catalyst is a boron fluoride amine complex.

The heated glass spheres will cause the core material to cure, and an additional heating in an oven can be accomplished to complete the curing if necessary. When the glass beads are not heated, the heat can be applied externally.

Good results have also been obtained using polyurethane resins as the core material. Polyurethane resins are the result of reactions between hydroxyl groups and polyiso cyanates. Examples are Multron and Mondur resins manufactured by Mobay Chemical, although several other companies also manufacture such resins. These resins are formulated from polyesters, polyethers, or other polyols and diisocyanatic or diisocyanate adducts.

Pigment may be added to the core material to impart reflection to the composition as well as color and opacity. To produce a white reflecting composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored compositions are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with varium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass cullet, and other natural or manufactured granular materials.

A specific example of a formulation which has given excellent results is:

Example 1

| | Parts by weight |
|---|---|
| Polyester resin composition | 100 |
| Titanox RA | 30 |
| Benzoyl peroxide | 5 |

The core material was sprayed as small liquid droplets onto a conveyor belt containing a layer of heated transparent glass spheres at approximately 300° F. maintained in a state of agitation. The liquid droplets picked up the glass spheres and became cured with the glass spheres partially embedded in their outer surfaces. After passing through an oven the reflective spheroids were cooled and ready for use in reflective markers.

Example 2

| | Parts by weight |
|---|---|
| Epoxy resin (Epon 828) | 100 |
| Catalyst for epoxy resin (diethylene triamine) | 10 |

The core material was spun into droplets off a rotating disc onto a conveyor belt containing a layer of small silvered glass spheres. The droplets picked up the glass spheres to cover their surfaces and solidified. The resulting spheroids were washed with nitric acid and yielded reflective granules with glass spheres partially embedded in their outer surfaces, the embedded portion only having the silvered coating.

Example 3

| | Parts by weight |
|---|---|
| Epoxy resin (Epotuf 6140) | 800 |
| Phenylglycidyl ether | 150 |
| Titanium dioxide | 200 |
| Asbestine | 400 |
| Boron trifluoride amine complex | 5 |

The above mixture was sprayed by a conventional spray gun as small liquid droplets into a mass of glass spheres which were heated to approximately 300° F. The droplets of core material were coated with the glass spheres and solidified under heat to yield the reflective spheroids. The phenylglycidyl ether acts as a diluent. The boron trifluoride amine complex acts as a catalyst which may be mixed with the other ingredients to give a system which is stable at room temperatures. The system cures at temperatures of approximately 300° F.

If desired, an aluminum powder or flake can be incorporated in the core material. For certain purposes a filler of glass cullet or gold or silverized glass cullet or flakes can be incorporated therein.

The size of the reflective spheroids is not critical as it is somewhat dependent on the size of the glass spheres incorporated. The usual size of spheroid is 2 to 10 times the diameter of the glass spheres used. The preferred size of spheroid is in the range of 1–10 mils.

The clear transparent binder 28 into which the reflective spheroids 27 are mixed is preferably a thermoplastic binder. Examples are Acryloids, such as acrylic and methacrylic resins, alkyd resins, cellulose nitrate resins, ethyl cellulose resins, vinyl resins, casein and other synthetic or natural resins. Examples of transparent binders are given in the Shuger Patents 2,268,537 and 2,275,597. Omission of the pigments specified will yield suitable transparent binders. A material may be added to the binder to render it thixotropic or gelled so as to maintain the spheroids in suspension.

One use of this mixture is for spraying onto a roadway as a traffic line. The material is also useful for applying onto a metal or other base for making reflective signs and the like. For some purposes, the binder material containing the reflective spheroids can be cast as a stiff sheet to form a reflectorized sign blank without a backing material.

The use of the reflective spheroids in accordance with the present invention has many advantages over the use of conventional traffic marking materials containing conventional glass spheres. First of all, much better results are obtained in traffic lines due to the wide angle visibility which is much wider than with glass spheres alone. The color return at grazing angles is very white. This may be explained because the light hits the side of the spheroid with the beads embedded. In this way, the observer, the light, the embedded bead and the background are in a straight line. On the other hand, with glass spheres the light is mostly at grazing angles and the light must be refracted downwards first and then back out in order to pick up the white color. Obviously, only a certain percentage of the light is reflected in this way. Thus particularly good results are obtained in traffic lines due to the excellent reflectivity and high angularity at grazing angles of the light. When using colored pigmented cores in the spheroids, colored light return may be obtained even though the binder used is colorless.

Extremely good results have been obtained yielding excellent immediate retro-reflection by use of a mixture of a transparent methyl methacrylate binder containing five lbs. per gallon of reflective spheroids made up of a polyester core coated with silvered glass spheres having an index of refraction of 2.4. The silver was removed from the exposed glass sphere surfaces of the spheroids before they were added to the binder. The spheroids had a diameter of about 3 mils. When such a mixture was sprayed onto a base it cured or dried quickly to form an immediately reflective marker.

Further, the reflective spheroids of this invention have a weight advantage over glass spheres since the composite reflective spheroid has approximately one-half the specific gravity of glass. Since the spheroids may be pigmented, less pigment, or none at all is required in the paint binder. Thus, the spheroids may be added to a clear binder and still give colored light return.

As indicated above, in the method of manufacture the liquid core is cured after the glass spheres have been partially embedded or partially encapsulated therein so that the resulting spheroid has a once cured monolithic core of thermosetting material. The terminology "once cured monolithic core of thermosetting material" as used in this specification and claims is meant to include a core made up of a single mass of thermosetting material which is cured all at one time as differentiated from core produced by applying a surface coating layer of binder onto a resinous or other type of rigid sub-core. It has been found that when the glass spheres are applied to the monolithic core of the present invention, the glass spheres become partially embedded therein at least 50% of the diameter of the spheres. When a rigid sub-core is used coated with a surface layer of binder, the glass spheres are found to be only embedded approximately 20% of their diameters. The latter have not been found satisfactory since they do not retain the glass spheres therein in the same manner as the presently claimed reflective spheroids.

When the liquid or semi-liquid core of the spheroid is first contacted with the glass spheres a physical crowding effect of the spheres is obtained which forms a solid outside skeleton introducing rigidity to the semi-liquid core before solidification has taken place. This effect controls to a certain extent the amount of embedment or encapsulation of the spheres.

It will be obvious to those skilled in the art that various changes may be made without departing from the spirit of the invention, and therefore, the invention is not limited to what is shown in the drawings and described in the specification but only as indicated in the appended claims.

What is claimed is:

1. A small retro-reflective particle consisting of an entirely once cured monolithic core of thermosetting material having its entire outer surface substantially covered with small glass spheres partially embedded and securely held therein, said spheres having an outer diameter in the range of ½–30 mils wherein the material in which said spheres are partially embedded constitutes the entire core of said particle, the size of said core being several times the diameter of said glass spheres.

2. A particle in accordance with claim 1 wherein the glass spheres are each reflectively coated on the embedded portion thereof.

3. A reflective marker which comprises a layer of a coating material having a plurality of retro-reflective particles partially embedded therein, said particles each comprising an entirely once cured monolithic core of thermosetting material having its entire outer surface substantially covered with small glass spheres partially embedded and securely held therein, said spheres having an outer diameter in the range of ½–30 mils wherein the material in which said spheres are partially embedded constitutes the entire core of said particle, the size of said core being several times the diameter of said glass spheres.

4. A reflective marking composition which comprises a binder material mixed with a plurality of small retro-reflective particles, said particles each comprising an entirely once cured monolithic core of thermosetting material having its entire outer surface substantially covered with small glass spheres partially embedded and securely held therein, said spheres having an outer diameter in the range of ½–30 mils wherein the material in which said spheres are partially embedded constitutes the entire core of said particle, the size of said core being several times the diameter of said glass spheres.

5. A reflective marking composition in accordance with claim 4 wherein the binder material is thixotropic whereby the reflective particles are maintained in suspension therein.

6. A particle in accordance with claim 1 wherein the thermosetting material is selected from the group consisting of a pigmented polyester resin composition and an epoxy resin, said polyester resin composition comprising the esterification product of at least one polybasic organic acid and at least one polyhydric alcohol wherein at least one acid or alcohol component contains a reactive double bond, in admixture with a vinylidene monomer which has been copolymerized therewith, and said epoxy resin comprising at least one resinous material containing reactive epoxy groups which has been cured to a solid state.

References Cited by the Examiner

UNITED STATES PATENTS

| | | |
|---|---|---|
| 2,268,537 | 12/1941 | Shuger. |
| 2,952,192 | 9/1960 | Nagin _____ 88—82 X |
| 3,025,764 | 3/1962 | McKenzie _____ 88—82 |
| 3,043,196 | 7/1962 | Palmquist et al. _____ 88—82 |
| 3,050,824 | 8/1962 | Lemelson _____ 88—82 X |

JEWELL H. PEDERSEN, *Primary Examiner.*

DONALD J. HOFFMAN, THOMAS L. HUDSON,
*Assistant Examiners.*